United States Patent [19]
Benson et al.

[11] Patent Number: 4,991,794
[45] Date of Patent: Feb. 12, 1991

[54] RADAR SEEKER TRANSIENT SUPPRESSOR

[75] Inventors: Anthony J. Benson, Grays; Frederick L. Pew, St. Albans; Oliver H. D. Walter, Harrow; Geoffrey Warman, Watford; Michael A. Jones, Radlett, all of England

[73] Assignee: The Marconi Company Limited, England

[21] Appl. No.: 399,490

[22] PCT Filed: Jan. 30, 1989

[86] PCT No.: PCT/GB89/00088
§ 371 Date: Sep. 11, 1989
§ 102(e) Date: Sep. 11, 1989

[87] PCT Pub. No.: WO89/07231
PCT Pub. Date: Aug. 10, 1989

[30] Foreign Application Priority Data
Jan. 29, 1988 [GB] United Kingdom ............... 8802075

[51] Int. Cl.$^5$ ............................................... F41G 7/22
[52] U.S. Cl. .................................................. 244/3.15
[58] Field of Search ............................. 244/3.19, 3.15

[56] References Cited

U.S. PATENT DOCUMENTS

| | | | |
|---|---|---|---|
| 3,897,917 | 8/1975 | Johnson | 244/3.16 |
| 4,090,250 | 5/1978 | Carlson et al. | 364/900 |
| 4,107,678 | 8/1978 | Powell | 343/7 ED |
| 4,160,974 | 7/1979 | Stavis | 343/16 M |
| 4,198,015 | 4/1980 | Yates et al. | 244/3.15 |
| 4,337,427 | 6/1982 | Maudal | 318/615 |
| 4,350,983 | 9/1982 | Blaha et al. | 343/103 |
| 4,465,249 | 8/1984 | Selince | 244/3.15 |

FOREIGN PATENT DOCUMENTS

| | | |
|---|---|---|
| 59-81710 | 5/1984 | Japan . |
| 1377032 | 12/1974 | United Kingdom . |
| 1535338 | 12/1978 | United Kingdom . |
| 1605249 | 3/1986 | United Kingdom . |

OTHER PUBLICATIONS

IEEE Transactions on Aerospace and Electronics Systems, vol. AES-20, No. 6, Nov. 1984, pp. 736–741, "Missile Guidance Based on Kalman Filter Estimation of Target Maneuver", by Y. M. Tang et al.

Primary Examiner—Charles T. Jordan
Assistant Examiner—Rochelle Lieberman
Attorney, Agent, or Firm—Kirschstein, Ottinger, Israel & Schiffmiller

[57] ABSTRACT

A radar seeker transient suppressor for an anti-radar homing missile in which glint effects upset the smooth tracking of a target by apparently changing the target position spasmodically. A seeker output signal is derived which is at least substantially independent of body movement e.g. the target sightline angle signal rather than the look angle signal (i.e. relative to a space reference rather than a body reference). This signal is used to control the steering either filtered or unfiltered according to whether the difference exceeds a threshold value or not. Both azimuth and elevation channels are treated similarly and in unison. An excessive filtered/unfiltered difference in either channel causes use of the filtered signal in both. A double integrating filter may be employed to avoid the relative displacement of output and input signals when the input is, or contains, a ramp component.

8 Claims, 2 Drawing Sheets

- - - - - - - - ORIGINAL OUTPUTS
- - - - FILTERED OUTPUTS ± LIM
———— FINAL STEERING SIGNAL

RADAR SEEKER TRANSIENT SUPPRESSOR

BACKGROUND OF THE INVENTION

1. Field of the Invention

This invention relates to transient suppressors for radar seekers in homing missiles.

2. Description of Related Art

With a radar-guided missile, the seeker output is generally not very smooth. During mid-course, the target signal strength may be low and the receiver output is then rather noisy. Near intercept, the signal is strong, but there may still be substantial irregular spikes on the output due to glint effects, i.e. sudden changes of the point of reflection of the radar signal.

With the seeker output being used to steer the missile, these disturbances cause corresponding disturbances to the missile body motion and to the trajectory itself. During mid-course, the transient noise can seriously disturb the trajectory and can cause a significant amount of induced drag on the missile (and perhaps also use up hydraulic fluid because of fluctuating fin deflection). Nearer intercept, the glint 'spikes' may well increase the miss distance.

It is known to incorporate a "mid-course filter" in the system, to smooth out the noise due to low target signal strength. The lag associated with this filter has a slugging effect on the overall system response to guidance signals, but this does not matter until the missile is fairly close to the target, i.e. during the terminal phase. Then, the filter is generally removed, or the lag is drastically reduced.

In the terminal phase, the glint spikes may be clipped by incorporating some limiting in the signal processing.

SUMMARY OF THE INVENTION

It is an object of the present invention to provide suppression of such glint transients throughout the missile flight.

According to the present invention, a radar seeker transient suppressor for a missile in which a control signal is derived from the seeker to control the missile steering and which is substantially independent of pitch and yaw motion of the missile, includes parallel paths for the signal including a filtered path and a relatively unfiltered path and means for selecting the filtered path when the difference between the instantaneous values of the filtered and unfiltered signals exceeds a threshold value and selecting the relatively unfiltered path when the signal difference does not exceed the threshold value.

The filtered and unfiltered paths may be included in each of azimuth and elevation channels, the two channels being switched to the filtered paths in the presence of the above signal difference exceeding the threshold value in either channel.

The filtered path preferably includes a filter comprising a double integrator such as to avoid displacement of the output signal from a linearly varying input signal.

The control signal may be the target sightline angle or target sightline rate.

There are preferably included means for selecting a reduced value of time constant for the filtered path in a terminal phase of the missile flight.

BRIEF DESCRIPTION OF THE DRAWINGS

A transient suppressor for a radar seeker in a homing missile will now be described, by way of example, with reference to the accompanying drawings, of which.

DETAILED DESCRIPTION OF THE PREFERRED EMBODIMENT

Figure 1:
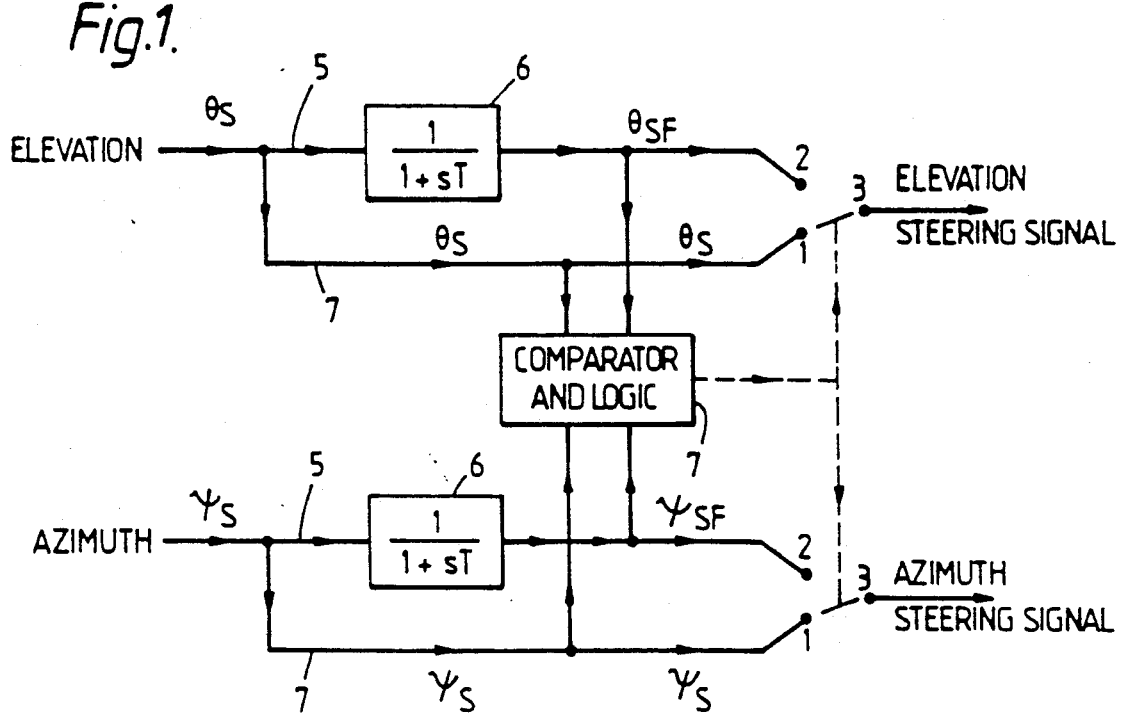
FIG. 1 is a circuit diagram of a filter system built into the azimuth and elevation output channels of the seeker.

Referring to FIG. 1, azimuth and elevation output signals from the seeker, $\psi_S$ and $\theta_S$, represent the sightline angles in space and may be obtained by subtracting body movement signals (from inertial devices) from look-angle signals the immediate output of the seeker. These signals $\psi_s$ and $\theta_s$ are each applied to parallel paths, a filtered path 5 and an unfiltered path 7. The filtered path contains an integrator 6 having a characteristic or transfer function $$1/(1+sT)$$

i.e. a 'single lag' filter where s is the differential operator d/dt and T is a time constant, typically one or two seconds.

The filtered outputs $\psi_{sf}$ and $\theta_{sf}$ are applied to switch contacts 2, and the unfiltered signals to the alternative switch contacts 1. The selected outputs at terminal 3 are then applied to the guidance system in known manner.

The switches are controlled by comparator and logic circuitry 7 in unison.

For each channel, elevation and azimuth, the original and filtered outputs are compared continuously by the comparator 7. If, at any time, the noise in both channels happens to be small, so that the original output is close to the filtered output in both elevation and azimuth, then the original outputs are used to steer the missile. On the other hand, if there is an appreciable noise spike in either channel, then the filtered outputs in both channels are used instead.

The comparator 7 takes the difference of the filtered and unfiltered outputs and compares the result against a specified angular limit LIM.

Then, the original outputs are used (i e. switches in position 1) if $$|\theta_s - \theta_{sf}| < \text{LIM} \text{ and } |\psi_s - \psi_{sf}| < \text{LIM}$$

Otherwise the filtered outputs are used (i.e. switches in position 2).

Figure 2A:
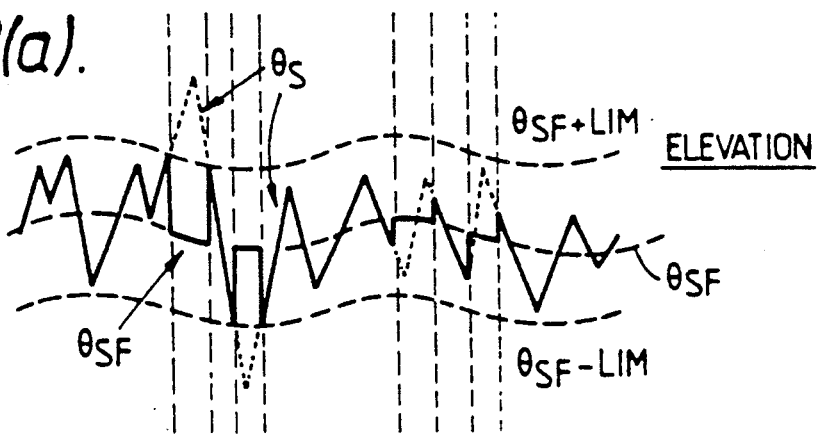
FIGS. 2(a) and 2(b) are diagrams of the filtered and unfiltered seeker output signals.
Figure 2B:
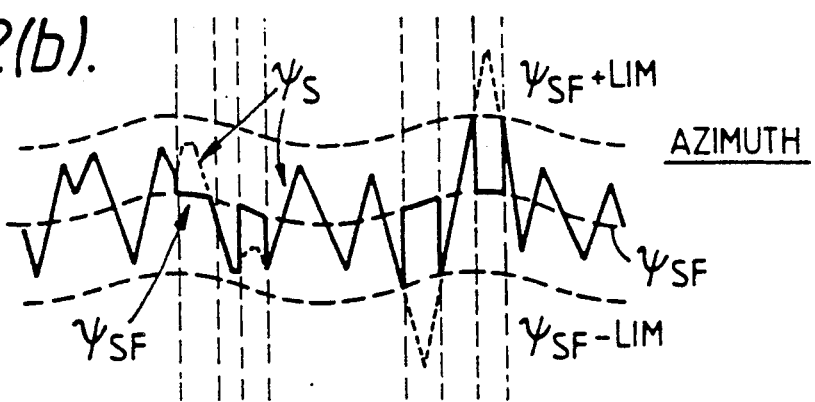

FIG. 2 illustrates the filtered and unfiltered signals and the selection between them.

$\theta_{sf}$ and $\psi_{sf}$ are shown as slowly varying signals responsive to tracking movements of the missile body on the flight path. Noise and glint effects (in the unfiltered signals) are shown as rapid transients imposed on the underlying signal. If the unfiltered signal $\psi_s$ or $\theta_s$ departs from the filtered signal by more than the limit value LIM in either channel then the selected output signal, the solid lines of FIGS. 2(a) and 2(b), reverts to the central filtered signal $\psi_{sf}$ and $\theta_{sf}$.

The selection is applied to both channels even though resulting from an excessive excursion in only one, because the glint signal is likely to have affected both channels although to different extents. The signal in the less affected channel is thus likely to have a significant glint component.

Figure 2C:
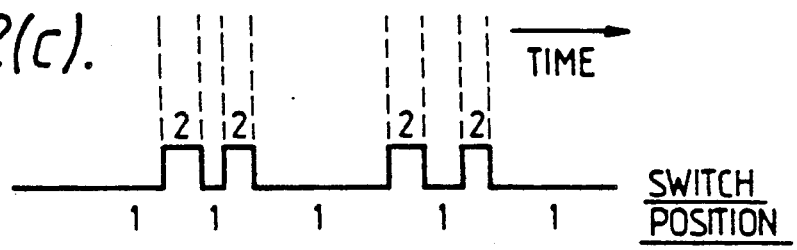
FIG. 2(c) is a diagram of the corresponding switch conditions, selecting between filtered and unfiltered signals.

FIG. 2(c) shows the switch condition in correspondence with the glint spikes.

With a substantial lag present (albeit intermittently) the filter must be located carefully in the missile system, as must a conventional mid-course filter. Otherwise the lag may well make the system unstable.

As explained earlier, there will be a point in the system where the steering signal from the guidance represents sight-line angle (or rate) in space. The filter must be installed at such a point, rather than a location where the signal represents angle-of-look or gimbal angle. In the latter cases the signal will incorporate a component of the body motion, i.e. the pitch and yaw motion which is relatively rapid compared to total body movement relative to the flight path. An attempt to dampen out such movements would very probably cause instability.

In the terminal stage of the missile flight, of which an indication is derived from measurements of lead angle, the time constant of the filter in each channel is reduced, by say half, i.e. the frequency response is increased, to avoid slugging the missile response excessively when rapid steering corrections may be required.

As well as being noisy, the original guidance may have a mean value that increases or decreases steadily with time (i.e. has the form of a ramp function) particularly if the output represents angle rather than rate. This is particularly likely to happen in elevation, where the trajectory may be designed to have some optimum shape.

When a ramp function is applied to the single lag integrator 6 of FIG. 1, the steady state output is a ramp of the same slope, but displaced by a certain amount—the "velocity lag". The magnitude of the misalignment is equal to the slope of the ramp times the value of the time constant T of the filter lag. It is constant if the slope of the ramp is constant.

The effect is undesirable for the present application as it results in asymmetrical clipping.

Figure 3:
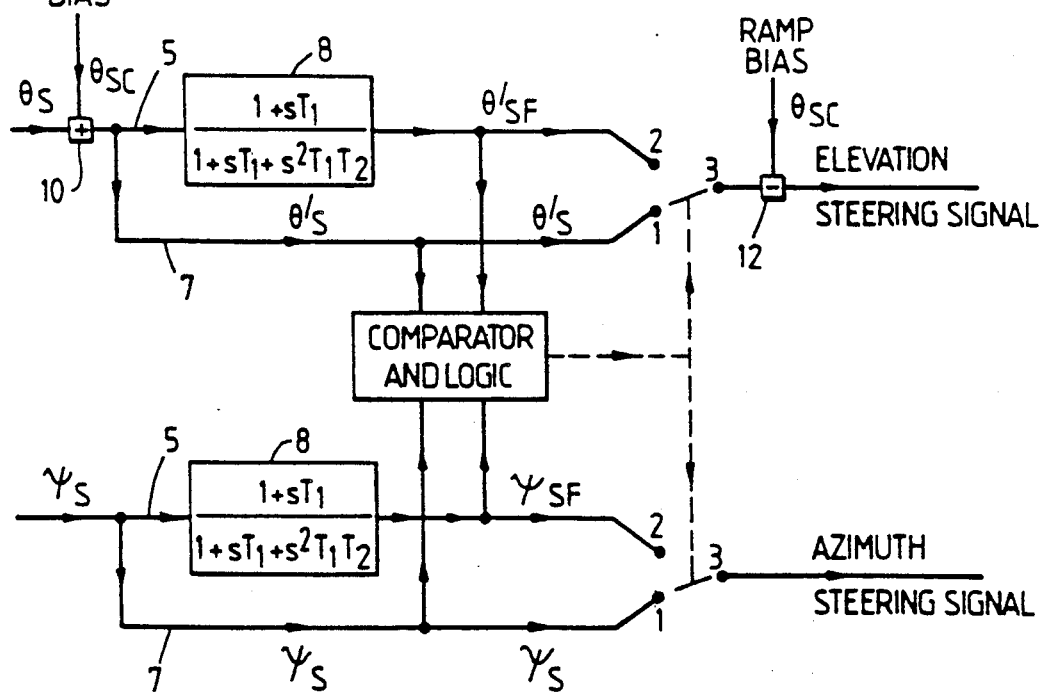
FIG. 3 is a circuit diagram of a Type 2 filter system built into the azimuth and elevation channels of the seeker.

Consequently, a Type 2 filter, (i.e. a double integrator 8) may be used, as shown in FIG. 3, as it does not suffer from this characteristic and, in a steady state, the mean output is aligned with the mean input. The overall response of the integrator 8 is of the form:

$$\frac{1 + sT_1}{1 + sT_1 + s^2 T_1 T_2}$$

$T_1$ and $T_2$, the two time constants involved, may be equal.

Although this Type 2 filter does not have a "velocity lag" in the steady state, the output may still take some time to settle down. Consequently for applications in which the magnitude of the ramp function is known approximately, the ramp is compensated empirically by adding (10) a varying (ramp) bias $\theta_{sc}$ on to the original guidance output $\theta_s$ and taking it out again downstream of the glint filter at subtractor 12. The net input to the filter is then fairly steady.

Again, this may be particularly relevant to the elevation channel of an anti-radar missile having a stationary land-based target, where the nominal trajectory characteristics may be pre-determined.

The empirical ramp compensation is therefore shown for elevation only, although clearly it may be used in both channels according to the circumstances.

We claim:

1. A transient suppressor system for a radar seeker in a missile, said system comprising:
   a control signal output from said seeker, said control signal being substantially independent of pitch and yaw motion of the missile;
   parallel paths for said control signal to generate output signals, said parallel paths including a filtered path and a relatively unfiltered path;
   means for comparing the output signals from said filtered path and from said unfiltered path to produce a difference signal; and
   means for selecting said filtered path when said difference signal exceeds a threshold value, and for selecting said relatively unfiltered path when said difference signal does not exceed said threshold value.

2. A transient suppressor system according to claim 1, including filtered and unfiltered paths in each of azimuth and elevation channels, the two channels being switched to the filtered paths in the presence of said difference signal exceeding said threshold value in either channel.

3. A transient suppressor system according to claim 1, wherein said filtered path includes a filter having a filter input signal and a filter output signal, said filter comprising a double integrator such as to avoid displacement of said filter output signal from said filter input signal when said filter input signal is varying linearly.

4. A transient suppressor system according to claim 1, wherein the missile has a missile track and a target sightline between said missile and a target, said control signal comprising a target sightline angle between said missile track and said target sightline.

5. A transient suppressor system according to claim 1, wherein the missile has a missile track and a target sightline between said missile and a target, said control signal comprising a rate of change of a target sightline angle between said missile track and said target sightline.

6. A transient suppressor system according to claim 1; and further comprising means for selecting a reduced value of time constant for said filtered path in a terminal phase of flight of the missile.

7. A transient suppressor system according to claim 2, wherein said filtered path includes a filter having a filter input signal and a filter output signal, said filter comprising a double integrator such as to avoid displacement of said filter output signal from said filter input signal when said filter input signal is varying linearly.

8. A transient suppressor system according to claim 2; and further comprising means for selecting a reduced value of time constant for said filtered path in a terminal phase of flight of the missile.

* * * * *